(12) United States Patent
Patel et al.

(10) Patent No.: US 11,349,985 B2
(45) Date of Patent: *May 31, 2022

(54) FEATURE REGULATION BETWEEN ENDPOINTS OF A MULTI-ENDPOINT COMMUNICATION SERVICE

(71) Applicant: Avaya Management L.P., Santa Clara, CA (US)

(72) Inventors: Arun Dutt Patel, Pune (IN); Debakanta Jena, Pune (IN)

(73) Assignee: Avaya Management L.P., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/407,361

(22) Filed: Aug. 20, 2021

(65) Prior Publication Data

US 2021/0385327 A1 Dec. 9, 2021

Related U.S. Application Data

(63) Continuation of application No. 16/848,157, filed on Apr. 14, 2020, now Pat. No. 11,122,161.

(51) Int. Cl.
*H04M 3/42* (2006.01)
*H04M 3/46* (2006.01)

(52) U.S. Cl.
CPC ....... *H04M 3/42272* (2013.01); *H04M 3/465* (2013.01); *H04M 2201/40* (2013.01); *H04M 2203/6054* (2013.01)

(58) Field of Classification Search
None
See application file for complete search history.

(56) References Cited

U.S. PATENT DOCUMENTS

| | | | | |
|---|---|---|---|---|
| 6,418,215 B1* | 7/2002 | Schessel | ............. | H04M 3/4217 379/201.01 |
| 7,162,020 B1* | 1/2007 | Forte | ................. | H04M 3/42263 379/201.01 |
| 9,509,853 B2* | 11/2016 | Mufti | .................... | H04M 3/465 |
| 11,122,161 B1* | 9/2021 | Patel | ................. | H04M 3/42272 |
| 2006/0234693 A1* | 10/2006 | Isidore | ................. | H04M 3/436 455/422.1 |
| 2012/0166652 A1* | 6/2012 | Bouthemy | .......... | H04L 65/1083 709/227 |
| 2012/0233327 A1* | 9/2012 | Smith | ................. | H04L 65/1006 709/225 |
| 2013/0141514 A1* | 6/2013 | Chao | ....................... | H04N 7/141 348/14.02 |
| 2016/0156783 A1* | 6/2016 | Mufti | .................. | H04L 65/1073 455/445 |

(Continued)

*Primary Examiner* — Harry S Hong

(57) ABSTRACT

The technology disclosed herein enables regulation of features provided by respective endpoints registered for a user in a multi-endpoint service. In a particular embodiment, a method includes, in response to determining that a first endpoint is being operated by a first user, associating the first endpoint with a primary designation and associating the second endpoint with a secondary designation. The method further includes allowing the first endpoint to provide a first set of communication features in accordance with the primary designation and preventing the second endpoint from providing the first set of communication features in accordance with the secondary designation.

20 Claims, 8 Drawing Sheets

(56) References Cited

U.S. PATENT DOCUMENTS

2016/0315977 A1* 10/2016 Stille ................. H04L 5/0055
2016/0330320 A1* 11/2016 Ghuli ................. H04M 3/02
2016/0373584 A1* 12/2016 Minutillo ............ G06F 3/162
2017/0041284 A1*  2/2017 Chen ................. H04L 67/24

* cited by examiner

FEATURE REGULATION BETWEEN
ENDPOINTS OF A MULTI-ENDPOINT
COMMUNICATION SERVICE

RELATED APPLICATIONS

This application is a continuation of U.S. patent application Ser. No. 16/848,157, entitled "FEATURE REGULATION BETWEEN ENDPOINTS OF A MULTI-ENDPOINT COMMUNICATION SERVICE," filed Apr. 14, 2020, which is hereby incorporated by reference in its entirety.

TECHNICAL BACKGROUND

Multi-endpoint communication services, such as multiple device access, allow for a user to have multiple devices that can be used to place and receive communication session requests. For example, a user may have a desktop phone and a mobile phone that are associated with a same phone number (or other type of identifier, such as username or handle) by a multi-endpoint service. The multi-endpoint service operates to route incoming call notifications for the phone number to both the desktop phone and the mobile phone. Likewise, the multi-endpoint service may operate to enable either the desktop phone or the mobile phone to place calls that indicate the phone number as the source of the call.

In addition to a feature allowing the user to place and receive calls, as discussed above, the multi-endpoint service may provide additional communication related features to the user. For example, the multi-endpoint service may allow the user to switch between devices during an active communication session, to access call log information on both devices, access contact information (e.g., names, phone numbers, email addresses, usernames, etc. for people/entities the user has saved in the contact information) on both devices, to access active communication session information from both devices, or some other feature related to communication sessions. If the user is using one device to participate on a communication session, the user, or another party, may operate the other device to access the communication features (e.g., to lookup contact information).

SUMMARY

The technology disclosed herein enables regulation of features provided by respective endpoints registered for a user in a multi-endpoint service. In a particular embodiment, a method includes, in response to determining that a first endpoint is being operated by a first user, associating the first endpoint with a primary designation and associating the second endpoint with a secondary designation. The method further includes allowing the first endpoint to provide a first set of communication features in accordance with the primary designation and preventing the second endpoint from providing the first set of communication features in accordance with the secondary designation.

In some embodiments, the two or more endpoints include a third endpoint. In those embodiments, the method further includes, in response to determining that the first endpoint is being operated by the first user associating the third endpoint with the secondary designation and preventing the third endpoint from providing the first set of communication features in accordance with the secondary designation.

In some embodiments, the two or more endpoints are all associated with the secondary designation prior to determining that the first endpoint is being operated by the first user.

In some embodiments, the second endpoint is associated with the primary designation prior to determining that the first endpoint is being operated by the first user.

In some embodiments, determining that the first endpoint is being operated by the first user includes receiving biometric identification of the first user through the first endpoint.

In some embodiments, determining that the first endpoint is being operated by the first user includes receiving a voice command from the first user through the first endpoint, wherein the voice command indicates that the first endpoint should be associated with the primary designation.

In some embodiments, after alerting the first endpoint and the second endpoint about an incoming communication, the method includes receiving an indication that the incoming communication is answered at the first endpoint and, in response to the indication, determining that the first endpoint is being operated by the first user.

In some embodiments, the method includes allowing the first endpoint and the second endpoint to provide a second set of communication features different than the first set of communication features.

In some embodiments, the first set of communication features include one or more of a group comprising participation in an active communication session, display of active communication session information, display of communication logs, and access to contact information.

In some embodiments, after associating the first endpoint with the primary designation and the second endpoint with the secondary designation, the method includes receiving a user instruction to deregister endpoints with the secondary designation and, in response to the user instruction, deregistering the second endpoint.

In another embodiment an apparatus includes one or more computer readable storage media and a processing system operatively coupled with the one or more computer readable storage media. Program instructions stored on the one or more computer readable storage media, when read and executed by the processing system, direct the processing system to, in response to a determination that the first endpoint is being operated by the first user associate the first endpoint with a primary designation and associate the second endpoint with a secondary designation. The program instructions further direct the processing system to allow the first endpoint to provide a first set of communication features in accordance with the primary designation and prevent the second endpoint from providing the first set of communication features in accordance with the secondary designation.

DETAILED DESCRIPTION

In the interest of security, a user may not want to allow all devices registered with a multi-endpoint service to provide all features of the multi-endpoint service. For example, if the user has both a desk phone and a mobile phone registered with the multi-endpoint service, the user may not want the desk phone to provide multi-endpoint service features while the user is away from the desk phone. The examples below describe a multi-endpoint service that prevents at least a portion of the multi-endpoint service's features from being provided on endpoints that are not designated as primary endpoints (i.e., secondary endpoints). Preventing provision of the features on secondary endpoints helps ensure that an unwanted party will not be able to access the features without permission from the user. When the user is away from the desk phone in the example above, the multi-endpoint service herein would prevent features from being provided by the desk phone since the user is not even around to use those features.

Figure 1:
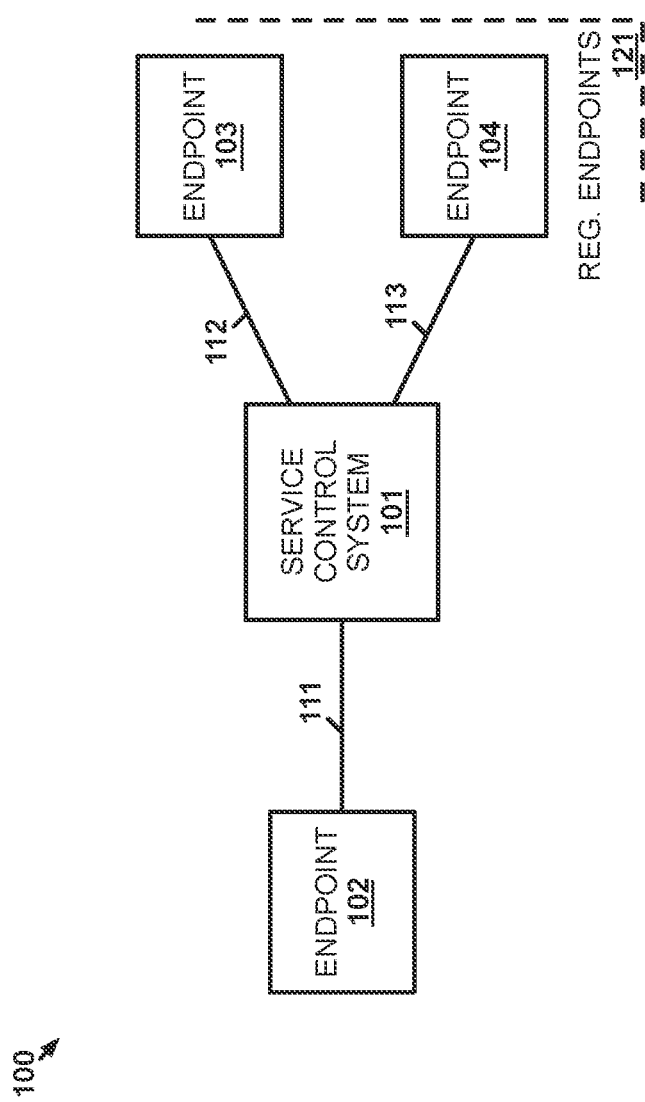
FIG. 1 illustrates an implementation for regulating features between endpoints of a multi-endpoint communication service.

FIG. 1 illustrates implementation 100 for regulating features between endpoints of a multi-endpoint communication service. Implementation 100 includes service control system 101, endpoint 102, endpoint 103, and endpoint 104. Service control system 101 and endpoints 102-104 communicate over communication links 111-113, respectively. Communication links 111-113 may comprise wireless and/or wired communication links and may include intervening communication networks, systems, and devices. Service control system 101 comprises processing and communication circuitry to provide communication services in the manner described below. Service control system 101 may be a single device, such as a communication server, or may be distributed across multiple devices. Endpoints 102-104 may each comprise a wired phone, wireless phone, desktop workstation, laptop computer, tablet computer, or any other type of user system or device capable of being an endpoint for exchanging user communications on behalf of their respective users.

In operation, service control system 101 provides a multi-endpoint service to registered endpoints 121 (i.e., endpoint 103 and endpoint 104), which a user has registered with the multi-endpoint service. While only two endpoints are included in registered endpoints 121 for this example, other examples may include a different number of endpoints in registered endpoints 121. The user may register an endpoint by installing a communications soft client for the multi-endpoint service on the endpoint and using the soft client to login to service control system 101 for provision of the multi-endpoint service. An endpoint may be registered with the service out of the box when initially connected to a communication network, an endpoint may have software (soft client or otherwise) preinstalled on the endpoint for registering the endpoint with service control system 101, the user may access a webpage interface that allows the user to register an endpoint, or any other manner in which a user can notify service control system 101 that a particular endpoint should be associated with the user for the provision of the multi-endpoint service. Once registered, the multi-endpoint service provides features to registered endpoints 121. For example, the features may include participating in active communication sessions, notifying each of registered endpoints 121 of incoming communication session requests directed to registered endpoints 121 (e.g., directed to a phone number, username, handle, etc. corresponding to registered endpoints 121 from endpoint 102), placing outgoing communication session requests directed from registered endpoints 121 (e.g., from a phone number, username, handle, etc. corresponding to registered endpoints 121), allowing the user to switch between devices of registered endpoints 121 during an active communication session, allowing a user to access active communication session information (e.g., information about duration and parties on an ongoing communication session with another endpoint of registered endpoints 121), allowing access to communication log information (e.g., logs describing past communications), allowing access to contact information on registered endpoints 121, allowing access to active communication session information from registered endpoints 121, allowing tracking of user presence with respect to the multi-endpoint service, or some other feature related to communication sessions. Depending on whether an endpoint is designated as primary or secondary, the features of the multi-endpoint service provided by service control system 101 may be different between the endpoints in registered endpoints 121.

Figure 2:
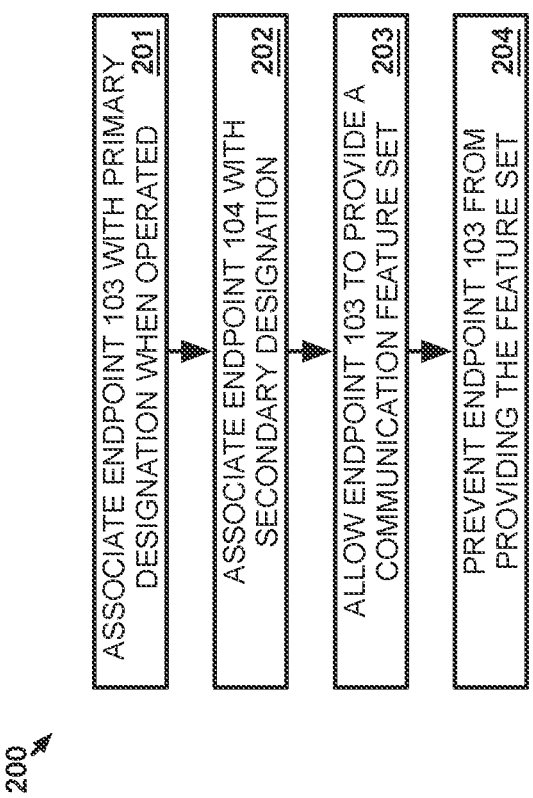
FIG. 2 illustrates an operational scenario to regulate features between endpoints of a multi-endpoint communication service.

FIG. 2 illustrates operational scenario 200 to regulate features between endpoints of a multi-endpoint communication service. In operational scenario 200, service control system 101 determines which endpoint(s) should be designated as primary or secondary based on which endpoint(s) a user associated with registered endpoints 121 is operating. Specifically, in response to determining that endpoint 103 is being operated by the first user, service control system 101 associates endpoint 103 with a primary designation (201). Service control system 101 also associates endpoint 104 with a secondary designation (202). In other examples, registered endpoints 121 may include more endpoints than endpoint 103 and endpoint 104 and, in those examples, service control system 101 may also associate those endpoints with a secondary designation since the user is operating endpoint 103. Service control system 101 may determine that the user is operating endpoint 103 based on endpoint 103 notifying service control system 101 that the user is operating endpoint 103. For example, the user may provide user credentials (e.g., an access PIN, password, etc.) associated with the user to gain access to endpoint 103 or may provide biometric information of the user to gain access to endpoint 103 and then endpoint 103 transfers a control message to service control system 101 notifying service control system 101 that the user is now operating endpoint 103.

Both endpoint 103 and endpoint 104 may have been associated with the secondary designation prior to endpoint 103 being associated with the primary designation. Alternatively, endpoint 104 may have been associated with the primary designation while endpoint 103 was associated with the secondary designation. The steps above, therefore, effectively exchanged the designations between the two devices. For example, the user may have previously been operating a desk phone, which caused the desk phone to have the primary designation, but then switched to a mobile phone that was previously secondary, which caused the primary designation to switch to the mobile phone and the secondary designation to switch to the desk phone. Likewise, it is also possible that the endpoint 103 was already primary and endpoint 104 was already secondary. In that case, steps 201 and 202 allow endpoint 103 and endpoint 104 to remain associated with their previous designations.

Service control system 101 then allows endpoint 103 to provide a first set of communication features in accordance with endpoint 103 having the primary designation (203). The set of communication features include multi-endpoint service features that are associated with the user of registered endpoints 121 (e.g., multi-endpoint service features to which the user subscribes or has otherwise identified as being services that should be provided) and are associated with endpoints having the primary designation. Service control system 101 also prevents endpoint 104 from providing the set of communication features in accordance with the secondary designation (204). As such, only endpoint 103 provides the set of features meant for devices having the primary designation while endpoint 104, due to its secondary designation, is not allowed to provide the set of features meant for devices having the primary designation. Preventing endpoint 104 from providing the set of features may include service control system 101 rejecting/ignoring requests for features in the set of features from endpoint 104, instructing endpoint 104 to not provide the set of features, notifying endpoint 104 of a secondary set of features endpoint 104 is allowed to provide, which does not include the set of features associated with the primary designation, or perform some other action that prevents the set of features from being provided by endpoint 104.

In some examples, the set of features above may include all features of the multi-endpoint service such that endpoint 104 would not be able to provide any features once associated with the secondary designation. However, there may be a secondary set of features that are provided by both primary and secondary devices. For example, incoming communication session notification may be a multi-endpoint service feature in the secondary set of features. When a communication session request directed to registered endpoints 121 is incoming from endpoint 102, then both endpoint 103 and endpoint 104 are notified of that incoming request (and are able to responsively generate a user notification) regardless of whether they are associated with a primary or secondary designation.

Figure 3:
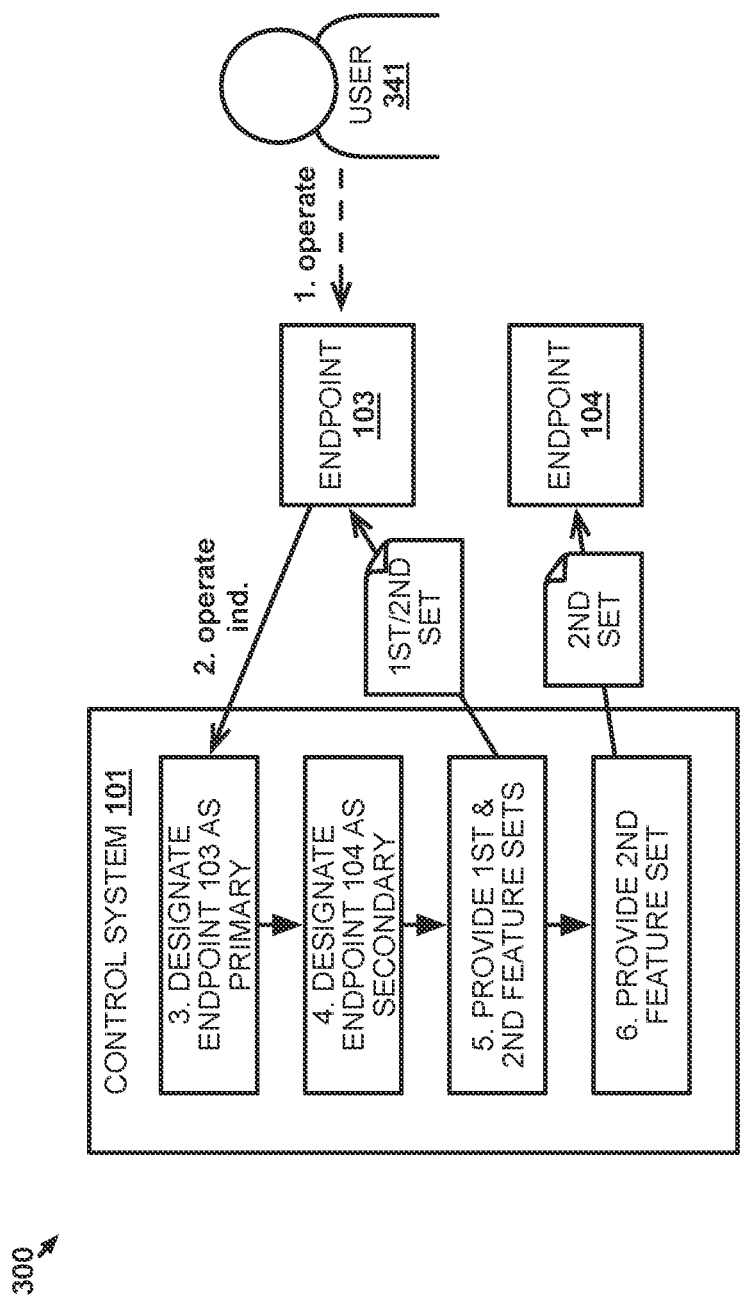
FIG. 3 illustrates another operational scenario to regulate features between endpoints of a multi-endpoint communication service.

FIG. 3 illustrates operational scenario 300 to regulate features between endpoints of a multi-endpoint communication service. Operational scenario 300 focuses on an operation of service control system 101, endpoint 103, and endpoint 104 from implementation 100. User 341 operates endpoint 103 at step 1. Operating endpoint 103 preferably includes user 341 providing information that securely identifies user 341, such as an access PIN, password, biometric information (e.g., fingerprint, face recognition, iris recognition, etc.), or other type of information that only user 341 is likely to have. Alternatively, endpoint 103 may simply assume that it is being operated by user 341 for the purposes of operational scenario 300 but that assumption would be less secure that requiring the information above.

In response to endpoint 103 determining that it is being operated by user 341, endpoint 103 transfers a message at step 2 that indicates user 341 is operating endpoint 103. The message may be transferred in a proprietary messaging protocol used by service control system 101 or may be sent using a standardized protocol. Upon receiving the message from endpoint 103, service control system 101 responsively designates endpoint 103 at step 3 as being a primary endpoint and designates endpoint 104 at step 4 as being a secondary endpoint (steps 3 and 4 occur at substantially the same time). Once the designations have been assigned to each of endpoint 103 and endpoint 104, service control system 101 provides multi-endpoint service features to endpoint 103 and endpoint 104 in accordance with those designations.

Specifically, the multi-endpoint service features in this example are divided between a first set of features and a second set of features. No feature of the multi-endpoint service features is included in both sets. Service control system 101 is configured such that service control system 101 allows endpoints having a primary designation to provide both the first and the second feature sets while endpoints having a secondary designation are allowed to provide the second feature set. Thus, a primary designation endpoint can provide all multi-endpoint service features while a secondary designation endpoint can only provide the second set of features.

Accordingly, service control system 101 allows endpoint 103 at step 5 to provide both the first and second feature sets while only allowing endpoint 104 at step 6 to provide the second feature set (steps 5 and 6 occur at substantially the same as long as endpoint 103 remains primary and endpoint 104 remains secondary). In one example, the first feature set includes any feature of the multi-endpoint service features that user 341 would not want someone else accessing when user 341 is not operating endpoint 104, endpoint 104 does not provide those features to other users. In contrast, the second feature set includes features of the multi-endpoint service user 341 would still want endpoint 104 to provide even though user 341 is operating endpoint 103. That is, the second feature set includes features that do not pose a security risk to user 341. For example, a feature in the second feature set may include notifying a user of an incoming communication while a feature that identifies a calling party for the incoming communication is included in the first feature set. Thus, service control system 101 allows endpoint 103 to provide incoming call notifications that also identify the calling party (e.g., phone number or name of the calling party) while endpoint 104 is only allowed to provide an incoming call notification without identifying the calling party.

Figure 4:
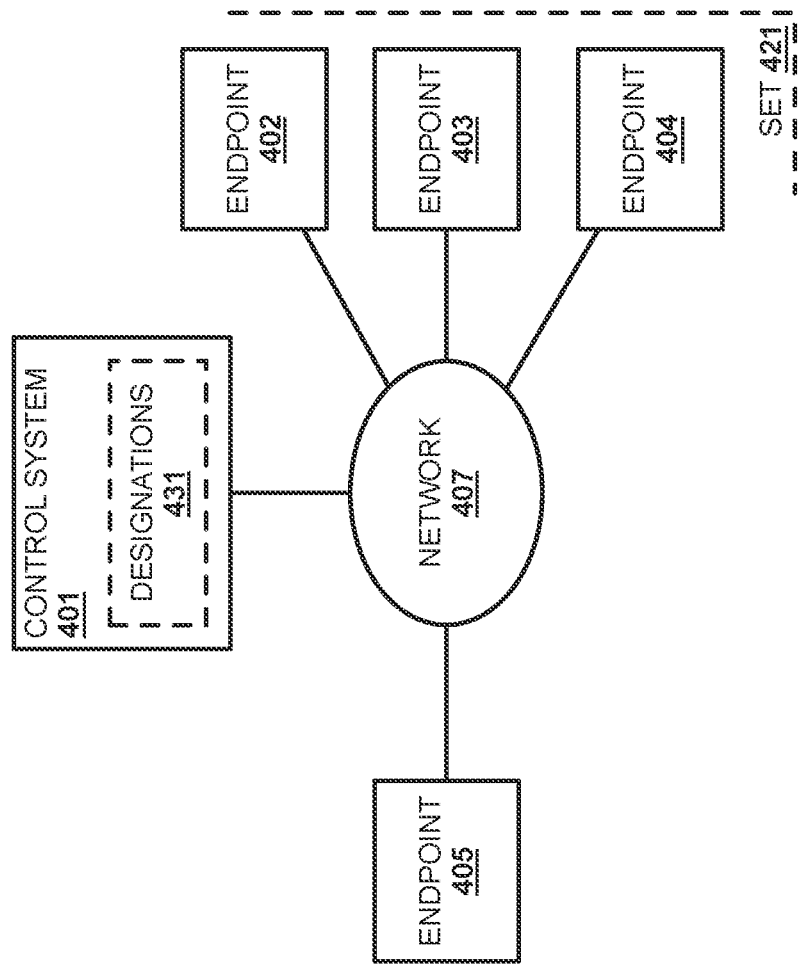
FIG. 4 illustrates another implementation for regulating features between endpoints of a multi-endpoint communication service.

FIG. 4 illustrates implementation 400 regulating features between endpoints of a multi-endpoint communication service. Implementation 400 includes service control system 401, endpoints 402-405, and communication network 407. Service control system 401 comprises processing and communication circuitry to provide communication services in the manner described below. Service control system 401 may be a single device, such as a communication server, or may be distributed across multiple devices. Endpoints 402-405 may each comprise a wired phone, wireless phone, desktop workstation, laptop computer, tablet computer, or any other type of user system or device capable of being an endpoint for exchanging user communications on behalf of their respective users. Communication network 407 includes one or more local area networks and/or wide area computing networks, including the Internet, over which service control system 401 and endpoints 402-405 communicate.

In operation, endpoints 402-404 are each registered with service control system 401 as being associated with a particular user, as described below. Endpoints 402-404 are, therefore, all considered part of endpoint set 421 associated with that user. Service control system 401 provides communication features of a multi-endpoint service to endpoints 402-404 in accordance with the designation assigned to each endpoint. In general, an endpoint having a primary designation is provided with (or at least allowed to be provided with) all communication features of service control system 401 that the user of endpoint set 421 has elected to receive (e.g., features to which the user has subscribed). An endpoint having a secondary designation is provided with fewer features than an endpoint with a primary designation (e.g., is provided only with features that do not allow access to private data of the user, such as the user's contacts list).

Figure 5:
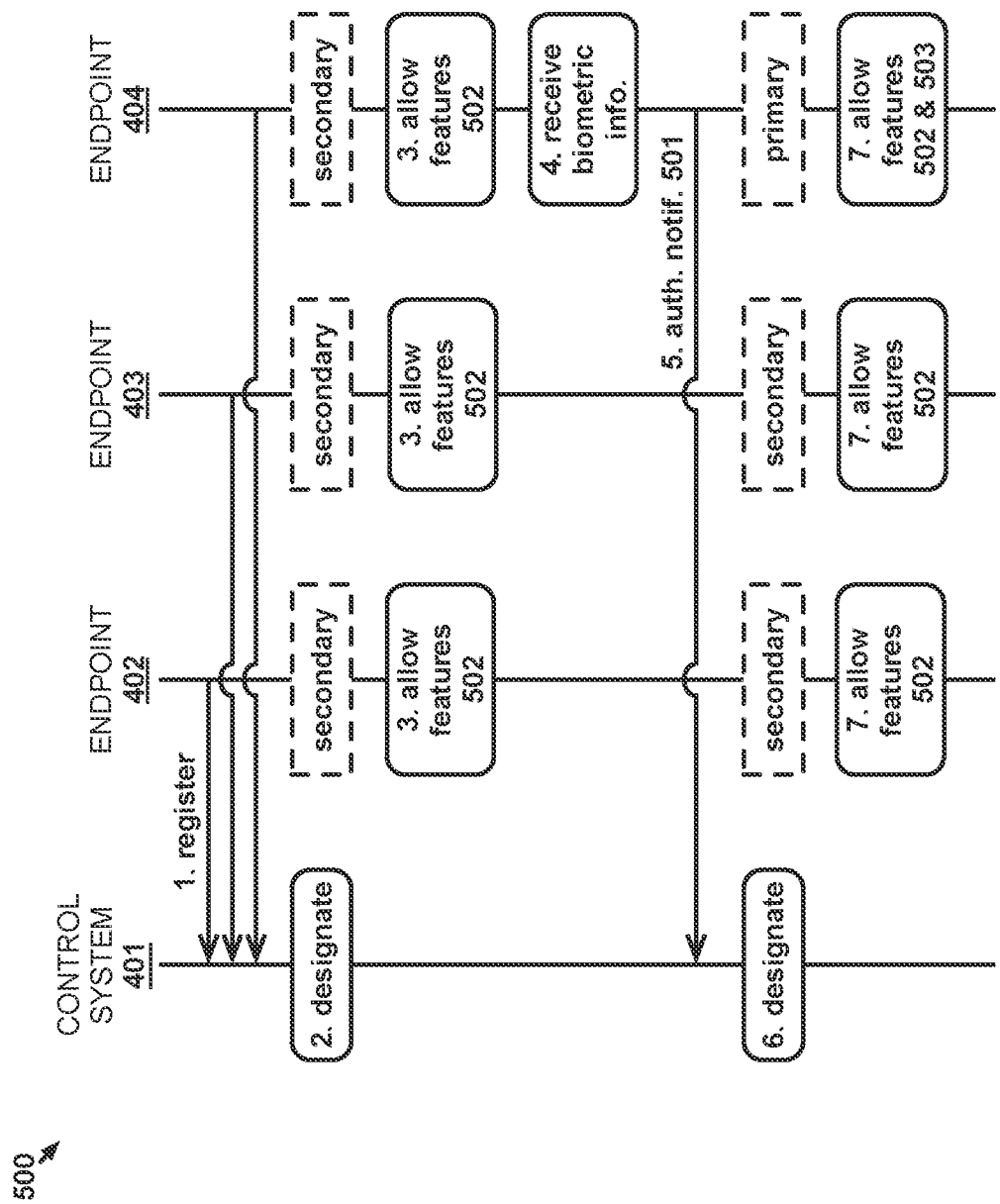
FIG. 5 illustrates an operational scenario to regulate features between endpoints of a multi-endpoint communication service.

FIG. 5 illustrates operational scenario 500 to regulate features between endpoints of a multi-endpoint communication service. In operational scenario 500, each of endpoints 402-404 register with service control system 401 at step 1 as being associated with a user for the multi-endpoint service. The user may provide user credentials to a communications soft client application associated with service control system 401 executing on an endpoint, an endpoint may be pre-registered with service control system 401 and, therefore, may be registered out of the box, an endpoint may have software (soft client or otherwise) preinstalled on the endpoint for registering the endpoint with service control system 101, the user may access a webpage interface that allows the user to register an endpoint, or any other manner in which a user can notify service control system 401 that a particular endpoint should be associated with the user for the provision of the multi-endpoint service. While all of endpoints 402-404 are shown in operational scenario 500 as registering with service control system 401 at substantially the same time, each endpoint may be registered at different times. For example, the user may first register endpoint 402 and endpoint 403 to use the multi-endpoint service in accordance with the examples herein with respect to only those two devices. At a later time, the user may register endpoint 404 to also use the multi-endpoint service.

After endpoints 402-404 are registered with service control system 401, service control system 401 associates each endpoint with a secondary designation at step 2. The designations for each endpoint are maintained by service control system 401 in endpoint designations 431. Endpoint designations 431 may comprise a data structure in a memory of service control system 401 where service control system 401 stores indications of the designations for endpoints in endpoint set 421. Alternatively, service control system 401 may maintain a profile for each of endpoints 402-404 in the memory and the designation associated with a respective endpoint may be indicated in the endpoint's profile. Other manners of tracking designations may also be used.

Based on each endpoint being designated as secondary, service control system 401 allows endpoints 402-404 to all provide features 502, which is a subset of the features for the multi-endpoint service of service control system 401. Features other than those in features 502 are included in features 503, which is another subset of the features for the multi-endpoint service. Only primary endpoints are allowed to provide features 503. The secondary designation currently assigned to endpoints 402-404 allows provision of features 502 but not features 503. Features 502 and 503 together may include all features of the multi-endpoint service, may be the features to which the user subscribes, or may be otherwise designated as the features that the user wants provided by a primary endpoint. In some examples, features 502 may be selected by the user or an administrator of the multi-endpoint service as being the subset of features that should be provided by secondary endpoints. In this example, it is assumed that endpoints 402-404 all have the same feature capabilities. However, in other examples, the capabilities may differ and, while certain features may be allowed, one or more endpoints may not be capable of providing those features.

To allow features 502 and not features 503, service control system 401 may instruct each of endpoints 402-404 to only provide features 502. Endpoints 402-404 would then limit their functionality accordingly. Service control system 401 may also prevent communications corresponding to features in features 503 from being exchanged with any of endpoints 402-404. For example, if providing caller ID and ongoing call information are features in features 503, then service control system 401 may not provide caller ID and ongoing call information to secondary endpoints. Other manners of limiting the features provided by a secondary endpoint may also be used as long as it results in the secondary endpoint providing features 502 and not features 503.

In this example, endpoint 404 receives biometric information at step 4 from the user. The biometric information may be captured from the user's fingerprint via a fingerprint sensor, from the user's face via a facial recognition sensor or camera, or may be some other type of biometric information. Endpoint 404 uses the biometric information to authenticate that the user is at least allowed to access features of the multi-endpoint service and may also be used to authenticate that the user can use endpoint 404 itself (e.g., may be used to allow access beyond a lock screen of endpoint 404). If the biometric information corresponds to biometric information previously stored for authenticating the user (e.g., a fingerprint signature stored in endpoint 404 matches a fingerprint signature in the biometric information), then endpoint 404 determines that the user is authenticated. Of course, if someone other than the user was attempting to access endpoint 404, then the biometric information would not match, and the other person would not be authenticated. While biometric information is used in this example, other examples may use voice commands, username/password, personal identification numbers, or some other type of identification information to authenticate the user.

After endpoint 404 authenticates the user, endpoint 404 transfers authentication notification 501 at step 5 to service control system 401. Authentication notification 501 indicates to service control system 401 that the user associated with endpoint set 421 is currently operating endpoint 404. In response to authentication notification 501, service control system 401 associates endpoint 404 with the primary designation in endpoint designations 431 at step 6 while endpoint 402 and endpoint 403 remain associated with the secondary designation. Once endpoint 404 is associated with the primary designation, service control system 401 allows endpoint 404 to provide both features 502 and features 503 at step 7. Since endpoint 402 and endpoint 403 both remain secondary, service control system 401 continues to allow endpoint 402 and endpoint 403 to provide features 502 but not features 503.

To allow features 502 and features 503, service control system 401 may instruct endpoint 404 to provide both features 502 and features 503. Service control system 401 may also begin allowing the exchange of communications corresponding to features in features 503 with endpoint 404. For example, a call may be incoming from endpoint 405 and alerting endpoints of that call may be a feature in features 502. Service control system 401 then alerts endpoints 402-404 accordingly. If providing caller ID and ongoing call information are features in features 503, then service control system 401 may provide caller ID and ongoing call information to endpoint 404 but not endpoints 402 and 403.

Advantageously, a person operating, or attempting to operate, an endpoint having a secondary designation will not be able to access features 503. Once the user has authenticated themselves to one of endpoints 402-404, then the user can access features 503 since features 503 may include features that the user does not want others to access, such as private information or communication applications.

While only one device is designated as primary in the above example, other examples may allow for multiple devices to be primary at once. Additionally, once endpoint 404 is designated primary service control system 401 may monitor for one or more conditions to exist that will automatically trigger service control system 401 to change endpoint 404 back to a secondary designation. For example, service control system 401 may be configured to change a primary endpoint back to secondary upon another endpoint becoming primary (e.g., upon biometric information from the user being authenticated at the other endpoint) and/or after endpoint 404 has been idle for a predefined amount of time.

Figure 6:
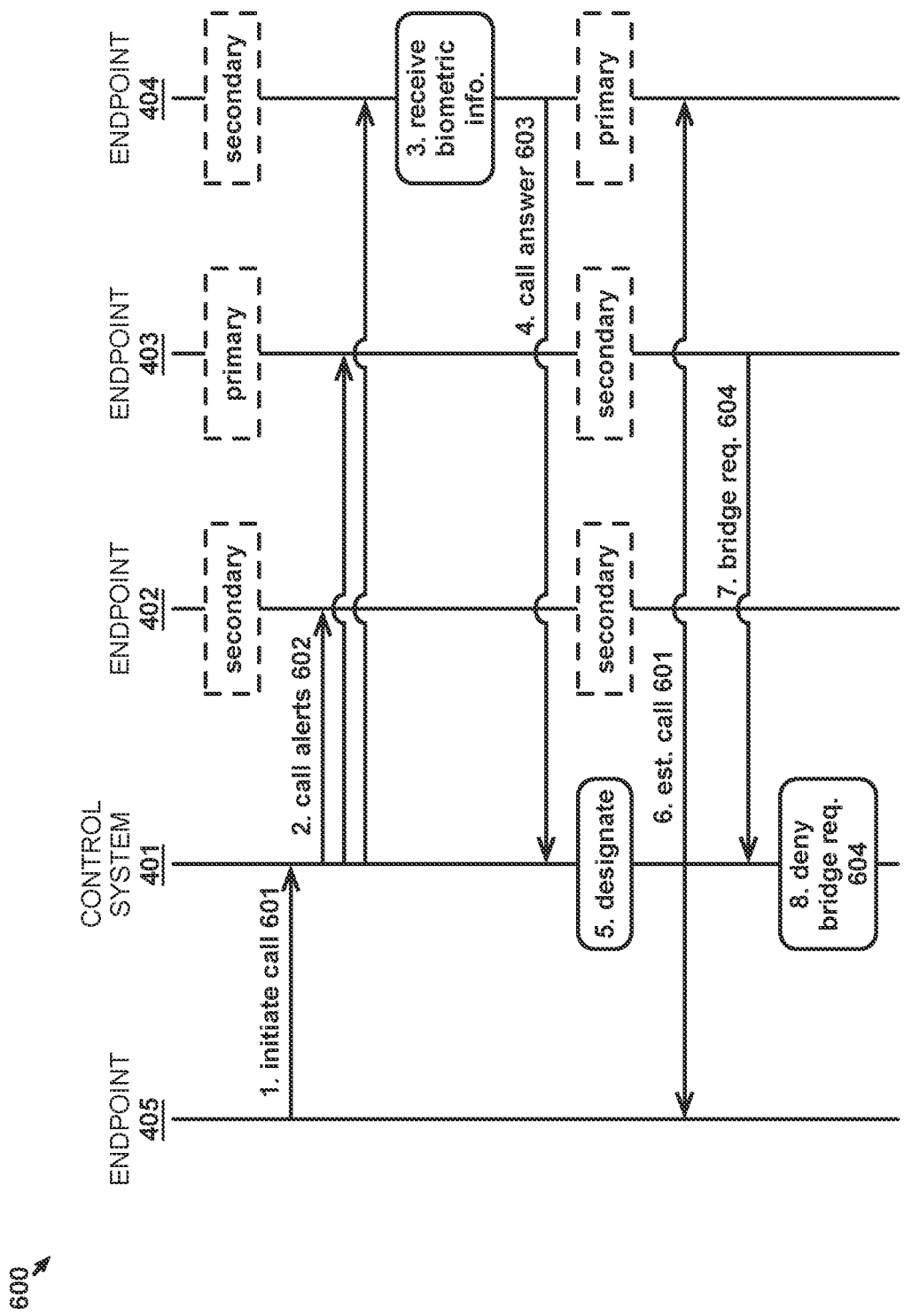
FIG. 6 illustrates another operational scenario to regulate features between endpoints of a multi-endpoint communication service.

FIG. 6 illustrates operational scenario 600 to regulate features between endpoints of a multi-endpoint communication service. In this example, endpoint 402 and endpoint 404 are secondary endpoints (i.e., are associated with the secondary designation in endpoint designations 431) and endpoint 403 is primary (i.e., is associated with the primary designation in endpoint designations 431). Though not shown, endpoint 402 and endpoint 404 provide features 502 but not features 503 while endpoint 403 provides features 502 and features 503. One feature of features 502 in this example is receiving call alerts. As such, when service control system 401 receives a request to initiate call 601 at step 1, service control system 401 responsively transfers call alerts 602 to endpoints 402-404 at step 2. Call 601 may be a voice or video call in any communications protocol compatible with service control system 401. Call alerts 602 may be in the same protocol used by endpoint 405 to initiate call 601 or may use a different protocol.

In response to receiving call alerts 602, each of endpoints 402-404 generates a user alert (e.g., ring, visual, and/or vibrate alert). After endpoint 404 generates the user alert, endpoint 404 receives biometric information from the user at step 3. The biometric information authenticates the user to endpoint 404 as the user associated with endpoint set 421, which allows endpoint 404 to answer call 601 by notifying service control system 401 that the call has been answered by the user at step 4 with call answer notification 603. Upon receiving the notification from endpoint 404, service control system 401 designates endpoint 404 as primary in endpoint designations 431 at step 5 and changes endpoint 403 to secondary. In this example, the ability to exchange user communications on a call is part of features 503. Therefore, service control system 401 changing the designation of endpoint 404 to primary allows endpoint 404 to exchange user communications after answering call 601.

Based on call 601 being answered at endpoint 404 and endpoint 404's primary designation, service control system 401 establishes call 601 at step 6 by creating a communication channel for user communications between endpoint 405 and endpoint 404 (e.g., real-time voice and/or video captured from the users at the respective endpoints). During the exchange of user communications for call 601, bridge request 604 is received in service control system 401 at step 7 from endpoint 403. In this example, bridging is not a feature in features 502 which secondary endpoints are allowed to provide. Consequently, service control system 401 denies bridge request 604 at step 8, which prevents endpoint 403 from bridging into call 601. In another example, endpoint 403 may receive biometric information from the user associated with endpoint set 421 that authenticates the user to endpoint 403. Based on that authentication, service control system 401 may designate endpoint 403 as being primary as well. Bridge request 604 would then be allowed based on endpoint 403 being a primary endpoint.

Figure 7:
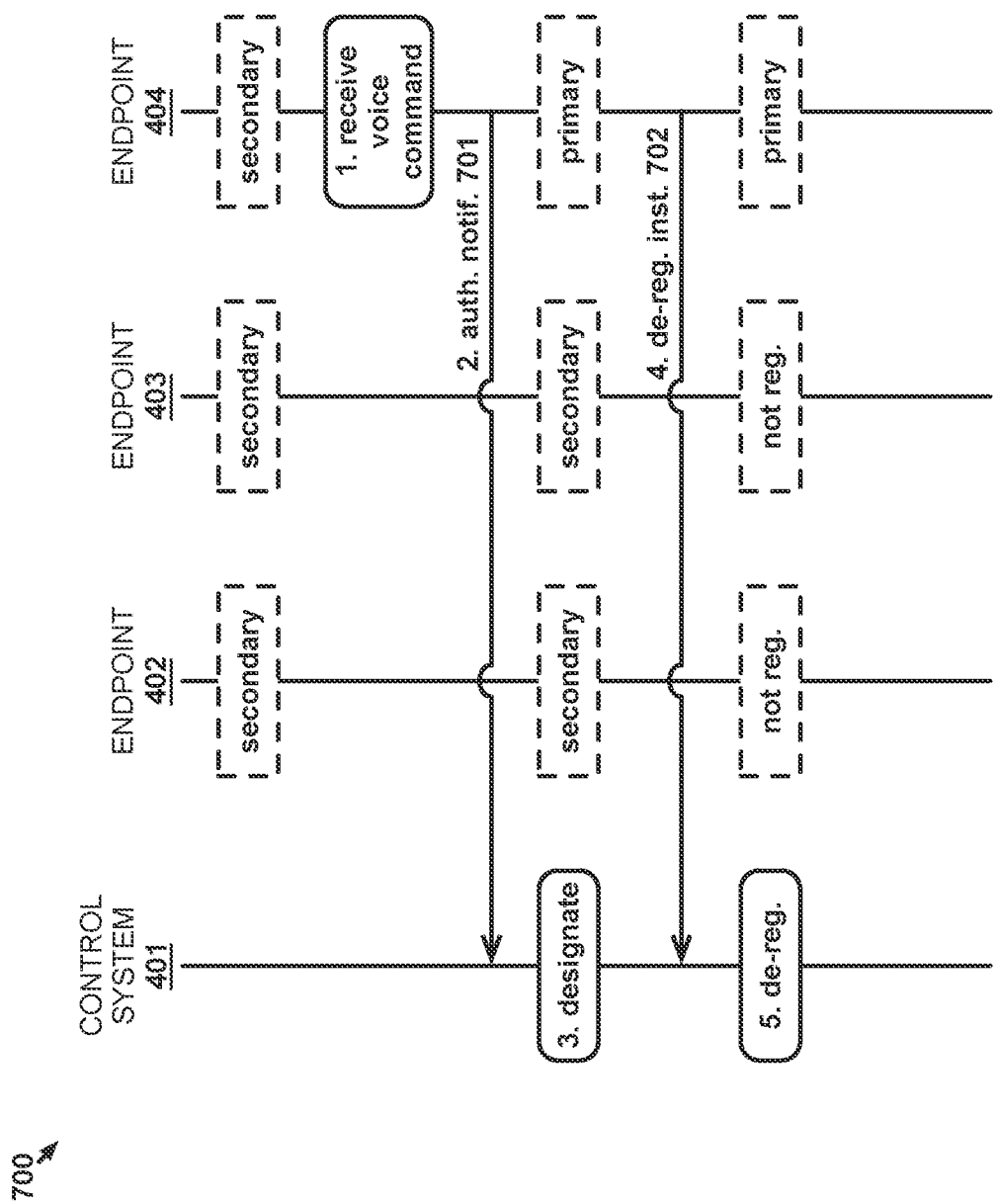
FIG. 7 illustrates yet another operational scenario for regulating features between endpoints of a multi-endpoint communication service.

FIG. 7 illustrates operational scenario 700 for regulating features between endpoints of a multi-endpoint communication service. At the onset of operational scenario 700, endpoints 402-404 are all secondary endpoints. Endpoint 404 receives a voice command at step 1 that indicates to endpoint 404 that it should be a primary device. The voice command may explicitly instruct that endpoint 404 to become a primary endpoint or may be implicit (e.g., may simply be a command to endpoint 404 that indicates the user is operating endpoint 404 in some manner). Preferably, endpoint 404 employs a voice recognition algorithm that allows endpoint 404 to authenticate the user as being the user associated with endpoint set 421. In some examples, after receiving the voice command, endpoint 404 may request additional information (e.g., personal identification number, password, etc.) to authenticate the user.

In response to authenticating the user, endpoint 404 transfers authentication notification 701 to service control system 401 at step 2, which indicates that the user is operating endpoint 404. In response to authentication notification 701, service control system 401 changes the designation of endpoint 404 to primary while endpoint 402 and endpoint 403 remain secondary. Therefore, endpoint 402 and endpoint 403 continue to provide features 502 but not features 503 while endpoint 404 can now provide both features 502 and features 503.

In this example, one of the features in features 503 allows a primary endpoint to deregister other endpoints from service control system 401. Endpoint 404 transfers de-registration instruction 702 at step 4 to service control system 401. De-registration instruction 702 may be transferred at the request of the user or may be transferred automatically by endpoint 404 upon endpoint 404 receiving the primary designation or upon some other condition being met. For example, endpoint 404 may be a cellphone that is configured to deregister other endpoints at the user's office when work hours are over (e.g., at 5 p.m. on Friday). Service control system 401 may similarly be configured to deregister endpoints automatically absent any instruction from a primary endpoint.

In response to de-registration instruction 702, service control system 401 deregisters endpoint 402 and endpoint 403. Endpoint 402 and endpoint 403 are no longer included in endpoint set 421 after being deregistered. As such, endpoint 402 and endpoint 403 are no longer able to provide any features of the multi-endpoint service until the user registers the endpoints with service control system 401 again. Deregistering an endpoint allows additional protection and privacy to the user because, unlike secondary endpoints, not even features 502 are allowed to be provided by endpoints that are not registered with service control system 401.

Figure 8:
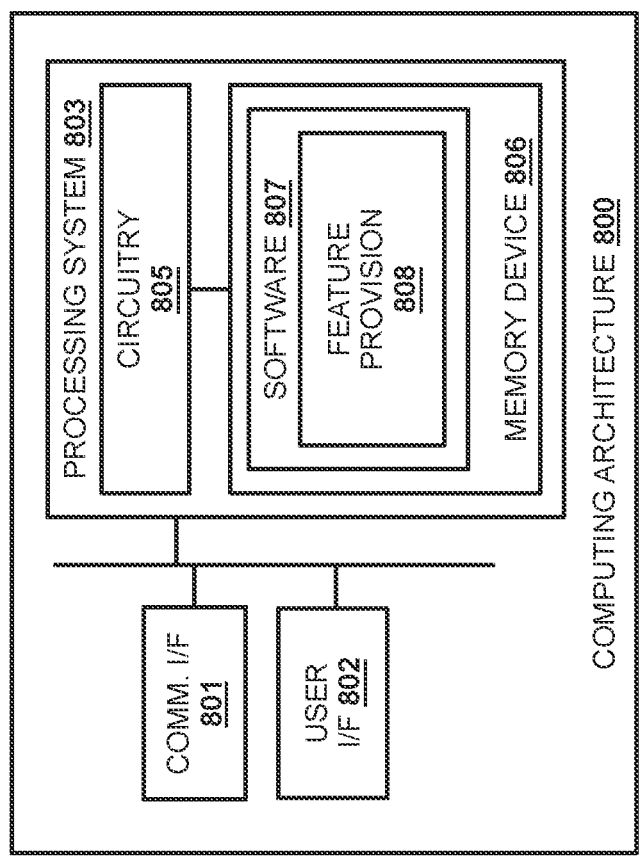
FIG. 8 illustrates a computing architecture for regulating features between endpoints of a multi-endpoint communication service.

FIG. 8 illustrates computing architecture 800 for regulating features between endpoints of a multi-endpoint communication service. Computing architecture 800 is an example computing architecture for service control system 101 and service control system 401, although systems 101 and 401 may use alternative configurations. A similar architecture may also be used for other systems described herein, although alternative configurations may also be used. Computing architecture 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a computer readable storage medium, such as a disk drive, flash drive, data storage circuitry, or some other memory apparatus. In no examples would a storage medium of memory device 806 be considered a propagated signal. Operating software 807 comprises computer programs, firmware, or some other form of machine-readable processing instructions. Operating software 807 includes feature provision instructions 808. Operating software 807 may further include an operating system, utilities, drivers, network interfaces, applications, or some other type of software. When executed by processing circuitry 805, operating software 807 directs processing system 803 to operate computing architecture 800 as described herein.

In particular, feature provision instructions 808 direct processing system 803 to associate the first endpoint with a primary designation and the second endpoint with a secondary designation in response to determining that the first endpoint is being operated by a first user. Feature provision instructions 808 further direct processing system 803 to allow the first endpoint to provide a first set of communication features in accordance with the primary designation and prevent the second endpoint from providing the first set of communication features in accordance with the secondary designation.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method for providing a multi-endpoint service to two or more endpoints registered to a first user, including a first endpoint and a second endpoint, the method comprising:
   in the first endpoint, determining that the first user is operating the first endpoint;
   in response to determining that the first user is operating the first endpoint, transferring a message from the first endpoint to a control system indicating that the first user is operating the first endpoint, wherein the control system associates the first endpoint with a primary designation and associates the second endpoint with a secondary designation in response to receiving the message; and
   in the first endpoint, accessing a first communication feature, wherein the control system allows access to the first communication feature by the first endpoint due to the first endpoint being associated with the primary designation, and wherein the control system prevents access to the first communication feature by the second endpoint due to the second endpoint being associated with the secondary designation.

2. The method of claim 1, wherein the two or more endpoints are all associated with the secondary designation prior to the control system receiving the message.

3. The method of claim 1, wherein the second endpoint is associated with the primary designation prior to the control system receiving the message.

4. The method of claim 1, wherein determining that the first user is operating the first endpoint comprises:
   receiving user credentials from the first user.

5. The method of claim 1, wherein determining that the first user is operating the first endpoint comprises:
   receiving biometric information from the first user; and
   authenticating the first user based on the biometric information.

6. The method of claim 1, wherein determining that the first user is operating the first endpoint comprises:
   receiving a voice command from the first user.

7. The method of claim 1, comprising:
   before transferring the message, receiving an alert notifying the first endpoint about an incoming communication, wherein the second endpoint also receives the alert.

8. The method of claim 1, comprising:
   in the first endpoint, prior to being associated with the primary designation, accessing a second communication feature different than the first communication feature.

9. The method of claim 1, wherein the first communication feature includes one of a group comprising:
   participation in an active communication session;
   display of active communication session information;
   display of communication logs; and
   access to contact information.

10. The method of claim 1, further comprising:
    transferring a user instruction from the first endpoint to the control system, wherein the user instruction directs the control system to deregister endpoints with the secondary designation.

11. An apparatus for providing a multi-endpoint service to two or more endpoints registered to a first user, including a first endpoint and a second endpoint, the apparatus comprising:
    one or more computer readable storage media;
    a processing system operatively coupled with the one or more computer readable storage media; and
    program instructions stored on the one or more computer readable storage media that, when read and executed by the processing system, direct the processing system to:
    determine that the first user is operating the first endpoint;
    in response to determining that the first user is operating the first endpoint, transfer a message from the first endpoint to a control system indicating that the first user is operating the first endpoint, wherein the control system associates the first endpoint with a primary designation and associates the second endpoint with a secondary designation in response to receiving the message; and in the first endpoint, access a first communication feature, wherein the control system allows access to the first communication feature by the first endpoint due to the first endpoint being associated with the primary designation, and wherein the control system prevents access to the first communication feature by the second endpoint due to the second endpoint being associated with the secondary designation.

12. The apparatus of claim 11, wherein the two or more endpoints are all associated with the secondary designation prior to the control system receiving the message.

13. The apparatus of claim 11, wherein the second endpoint is associated with the primary designation prior to the control system receiving the message.

14. The apparatus of claim 11, wherein determining that the first user is operating the first endpoint comprises:
receiving user credentials from the first user.

15. The apparatus of claim 11, wherein determining that the first user is operating the first endpoint comprises:
receiving biometric information from the first user; and
authenticating the first user based on the biometric information.

16. The apparatus of claim 11, wherein determining that the first user is operating the first endpoint comprises:
receiving a voice command from the first user.

17. The apparatus of claim 11, wherein the program instructions direct the processing system to:
before transferring the message, receiving an alert notifying the first endpoint about an incoming communication, wherein the second endpoint also receives the alert.

18. The apparatus of claim 11, wherein the program instructions direct the processing system to:
in the first endpoint, prior to being associated with the primary designation, accessing a second communication feature different than the first communication feature.

19. The apparatus of claim 11, wherein the first communication feature includes one of a group comprising:
participation in an active communication session;
display of active communication session information;
display of communication logs; and
access to contact information.

20. One or more computer readable storage media having program instructions stored thereon for providing a multi-endpoint service to two or more endpoints registered to a first user, including a first endpoint and a second endpoint, the program instructions, when read and executed by a processing system, direct the processing system to:
determine that the first user is operating the first endpoint;
in response to determining that the first user is operating the first endpoint, transfer a message from the first endpoint to a control system indicating that the first user is operating the first endpoint, wherein the control system associates the first endpoint with a primary designation and associates the second endpoint with a secondary designation in response to receiving the message; and
in the first endpoint, access a first communication feature, wherein the control system allows access to the first communication feature by the first endpoint due to the first endpoint being associated with the primary designation, and wherein the control system prevents access to the first communication feature by the second endpoint due to the second endpoint being associated with the secondary designation.

* * * * *